(12) United States Patent
Kim et al.

(10) Patent No.: US 12,352,696 B2
(45) Date of Patent: Jul. 8, 2025

(54) SURFACE PLASMON RESONANCE IMAGING APPARATUS AND METHOD

(71) Applicant: Electronics and Telecommunications Research Institute, Daejeon (KR)

(72) Inventors: Soocheol Kim, Daejeon (KR); Jeongkyun Kim, Daejeon (KR); Hyunseok Kim, Daejeon (KR); Jin Hwa Ryu, Daejeon (KR); So Yung Park, Daejeon (KR); Hoe-Sung Yang, Daejeon (KR); Kang Bok Lee, Daejeon (KR); Sun-Hwa Lim, Daejeon (KR); Kwang-Soo Cho, Daejeon (KR); Kyu Won Han, Daejeon (KR); Sang Gi Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 291 days.

(21) Appl. No.: 18/091,180

(22) Filed: Dec. 29, 2022

(65) Prior Publication Data

US 2024/0125706 A1    Apr. 18, 2024

(30) Foreign Application Priority Data

Oct. 17, 2022    (KR) .................. 10-2022-0133404

(51) Int. Cl.
*G01N 21/65*    (2006.01)
*G01N 21/25*    (2006.01)
*G01N 21/59*    (2006.01)

(52) U.S. Cl.
CPC ..... *G01N 21/658* (2013.01); *G01N 2021/258* (2013.01); *G01N 2021/5903* (2013.01); *G01N 2201/08* (2013.01)

(58) Field of Classification Search
CPC .......... G01N 21/658; G01N 2021/258; G01N 2021/5903; G01N 2201/08; G01N 21/4133; G01N 21/553; G01N 21/255
See application file for complete search history.

(56) References Cited

U.S. PATENT DOCUMENTS 6,807,323 B2    10/2004  Beom et al.
7,327,445 B2     2/2008  Yin et al.
(Continued)

FOREIGN PATENT DOCUMENTS

CN          108917930 A    11/2018
JP         2001255267 A     9/2001
(Continued)

*Primary Examiner* — Tarifur R Chowdhury
*Assistant Examiner* — Kemaya Nguyen
(74) *Attorney, Agent, or Firm* — WILLIAM PARK & ASSOCIATES LTD.

(57) ABSTRACT

A surface plasmon resonance imaging apparatus is provided. The surface plasmon resonance imaging apparatus includes a light irradiation unit configured to irradiate polarized light onto a metal coating film provided on one surface of a prism, a light modulator configured to spatially pattern-encode light reflected by the metal coating film and the prism, a light detector configured to detect a pattern-encoded light signal, obtained through pattern-encoding by the light modulator, as a spectral signal, a signal processor configured to spatially decode the spectral signal and analyze a decoded spectral signal to generate characteristic data of a sample provided on the metal coating film, and an output unit configured to output the characteristic data of the sample as a two-dimensional (2D) image.

9 Claims, 5 Drawing Sheets

(56) References Cited

U.S. PATENT DOCUMENTS

| | | | | |
|---|---|---|---|---|
| 2009/0005660 A1* | 1/2009 | Cappo | ................. | G01N 33/84 |
| | | | | 600/318 |
| 2010/0262212 A1* | 10/2010 | Shoham | ................. | A61N 5/06 |
| | | | | 607/88 |
| 2014/0066331 A1 | 3/2014 | Choi et al. | | |
| 2015/0168300 A1* | 6/2015 | Peterson | ................. | G02B 21/00 |
| | | | | 356/445 |
| 2017/0212610 A1* | 7/2017 | Thomas | ................. | G06F 3/0304 |
| 2023/0018507 A1* | 1/2023 | Kim | ................. | G01J 3/0237 |
| 2024/0003869 A1* | 1/2024 | Cetin | ................. | G01N 21/554 |

FOREIGN PATENT DOCUMENTS

| | | | |
|---|---|---|---|
| KR | 20030042576 | A | 6/2003 |
| KR | 20100061038 | A | 6/2010 |
| KR | 20100061222 | A | 6/2010 |
| KR | 101879794 | B1 | 7/2018 |
| KR | 1020200129052 | A | 11/2020 |

\* cited by examiner

SURFACE PLASMON RESONANCE IMAGING APPARATUS AND METHOD

CROSS-REFERENCE TO RELATED APPLICATIONS

This application claims priority to the Korean Patent Application No. 10-2022-0133404 filed on Oct. 17, 2022, in the Korean Intellectual Property Office, which is hereby incorporated by reference as if fully set forth herein.

BACKGROUND

Field of the Invention

The present invention relates to technology for measuring a surface plasmon resonance image.

Discussion of the Related Art

Electrons in a metal surface vibrate in a vertical direction (normal) with respect to the metal surface to perform a collective vibration motion. This is referred to as a surface plasmon wave. A vibration of a quantized electron is a surface plasmon. Various surface plasmon technologies have been proposed for quantitatively analyzing a material by using a phenomenon where the surface plasmon is excited by light waves.

Such surface plasmon resonance (SPR) technology is being actively used as a biosensor which measures a bio-sample in addition to measuring a concentration, a thickness, and a refractive index of a dielectric contacting a metal surface.

SPR technology of the related art is possible to measure only surface plasmon resonance and is impossible to measure a surface plasmon resonance image for analyzing a characteristic of a sample with a two-dimensional image, and the application range thereof is limited.

SUMMARY

An aspect of the present invention is directed to providing a surface plasmon resonance imaging apparatus and method, which may measure a surface plasmon resonance image of a sample in a two-dimensional space to analyze a characteristic of the sample (for example, a concentration, a thickness, and a refractive index of a dielectric) with a two-dimensional image.

To achieve these and other advantages and in accordance with the purpose of the invention, as embodied and broadly described herein, there is provided a surface plasmon resonance imaging apparatus including: a light irradiation unit configured to irradiate polarized light onto a metal coating film provided on one surface of a prism; a light modulator configured to spatially pattern-encode light reflected by the metal coating film and the prism; a light detector configured to detect a pattern-encoded light signal, obtained through pattern-encoding by the light modulator, as a spectral signal; a signal processor configured to spatially decode the spectral signal and analyze a decoded spectral signal to generate characteristic data of a sample provided on the metal coating film; and an output unit configured to output the characteristic data of the sample as a two-dimensional (2D) image.

In an embodiment, the light modulator may pattern-encode the reflected light as a 2D pattern.

In an embodiment, the 2D pattern may include a random pattern, a structured pattern, a Fourier pattern, and a Hadamard pattern.

In an embodiment, the light modulator may include a spatial light modulator or a digital micro-mirror device, which spatially pattern-encodes the reflected light.

In an embodiment, the light modulator may include an acousto-optic modulator or a pattern disk, which spatially pattern-encodes the reflected light.

In an embodiment, the light detector may include a spectroscope configured to detect the pattern-encoded light signal as a spectral signal.

In an embodiment, the light detector may include: a lens configured to concentrate the pattern-encoded light signal on an optical fiber; and a spectroscope configured to detect the pattern-encoded light, transferred through the optical fiber, as the spectral signal.

In another aspect of the present invention, there is provided a surface plasmon resonance imaging method including: irradiating polarized light onto a metal coating film provided on one surface of a prism by using a light irradiation unit; spatially pattern-encoding light reflected by the metal coating film and the prism by using a light modulator; detecting a pattern-encoded light signal as a spectral signal by using a light detector; spatially decoding the spectral signal and analyzing a decoded spectral signal to extract characteristic data of a sample provided on the metal coating film by using a signal processor; and outputting the characteristic data of the sample as a two-dimensional (2D) image by using an output unit.

It is to be understood that both the foregoing general description and the following detailed description of the present invention are exemplary and explanatory and are intended to provide further explanation of the invention as claimed.

DETAILED DESCRIPTION OF THE INVENTION

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

Figure 1:
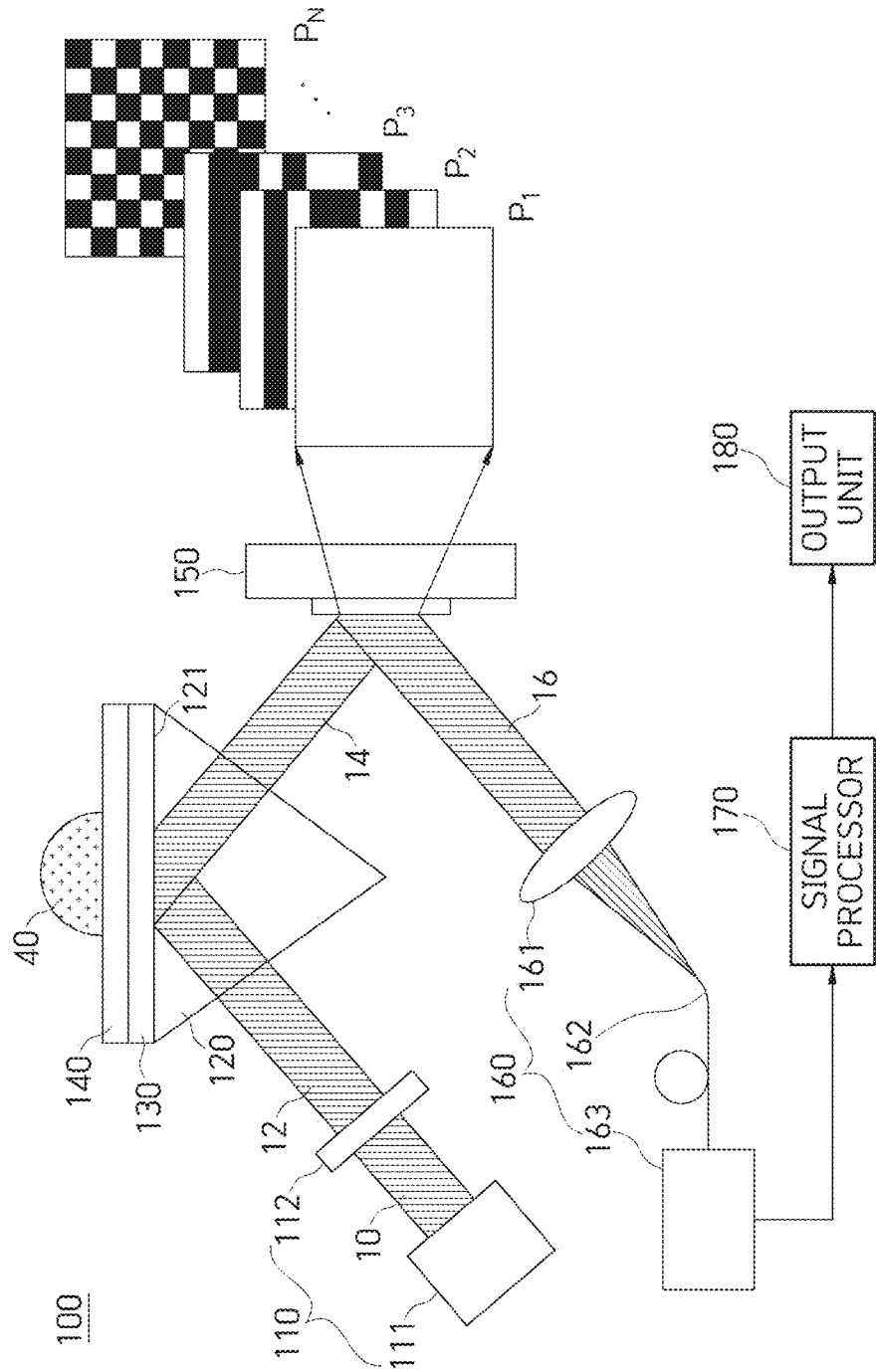
FIG. 1 is a block diagram of a surface plasmon resonance imaging apparatus according to an embodiment of the present invention.

FIG. 1 is a block diagram of a surface plasmon resonance imaging apparatus 100 according to an embodiment of the present invention.

Referring to FIG. 1, the surface plasmon resonance imaging apparatus 100 according to an embodiment of the present invention may include a light irradiation unit 110, a prism 120, a transparent substrate 130, a metal coating film 140, a light modulator 150, a light detector 160, a signal processor 170, and an output unit 180.

The light irradiation unit 110 may be configured to irradiate polarized light onto the metal coating film 140 provided on one surface of the prism 120. To this end, the light irradiation unit 110 may include a broadband light source 111 and a polarization filter 112. The broadband light source 111 may generate broadband light 10 (hereinafter referred to as light). The generated light 10 may be polarized by the polarization filter 112.

Polarized light 12 obtained through polarization by the polarization filter 112 may be incident on the prism 120 at a specific incident angle which enables surface plasmon resonance to be generated and may be irradiated onto the metal coating film 140 provided on one surface 121 of the prism 120.

In detail, the transparent substrate 130 may be disposed between the one surface 121 of the prism 120 and the metal coating film 140, and the metal coating film 140 may be formed on the transparent substrate 130. Accordingly, the polarized light 12 passing through the prism 120 may pass through the prism 120 and the transparent substrate 130 provided on the one surface 121 of the prism 120 and may be irradiated onto the metal coating film 140.

A sample 40 may be formed on the metal coating film 140, and when a concentration, a thickness, or a refractive index of the sample 40 varies between the metal coating film 140 and the sample 40, a surface plasmon resonance condition may be changed. Therefore, the amount of light 14 reflected to the below-described light modulator 150 may be changed, and a characteristic of the sample 40 formed on the metal coating film 140 may be measured by using the changed amount of light. A material capable of being used as the metal coating film 140 may include, for example, copper, platinum, and aluminum, and the metal coating film 140 may use all metals having a free electron without a limitation of the kind thereof.

The light modulator 150 may spatially pattern-encode the light 14 reflected by the metal coating film 140 and the prism 120. For example, the light modulator 150 may encode the reflected light as different two-dimensional (2D) patterns P1, P2, P3, . . . , and PN for a certain time. Here, the 2D pattern may include a random pattern, a structured pattern, a Fourier pattern, and a Hadamard pattern.

To spatially pattern-encode the reflected light 14, the light modulator 150 may include at least one of a spatial light modulator (SLM), a digital micro-mirror device (DMD), an acousto-optic modulator (AOM), and a pattern disk.

The light detector 160 may detect a light signal 16, obtained through pattern-encoding by the light modulator 150, as a spectral signal. To this end, the light detector 160 may include a spectrometer.

In more detail, the light detector 160 may include a lens 161, an optical fiber 162, and a spectroscope 163. The lens 161 may concentrate the pattern-encoded light signal 16 on the optical fiber 162. The spectroscope 163 may detect, as the spectral signal, the pattern-encoded light signal received through the optical fiber 162.

The signal processor 170 may spatially decode the spectral signal detected by the light detector 160 and may analyze the decoded spectral signal to generate and/or extract characteristic data of the sample provided on the metal coating film 140.

To decode the spectral signal and analyze the decoded spectral signal, the signal processor 170 may be a processor (for example, a central processing unit (CPU) and a graphics processing unit (GPU)) which performs an arithmetic operation and processing on data, a microcontroller unit (MCU), or a system on chip (SoC).

The output unit 180 may be a display device which displays the characteristic data of the sample, generated and/or extracted by the signal processor 170, as a 2D image. Here, the 2D image may denote a surface plasmon resonance image.

Figure 2A:
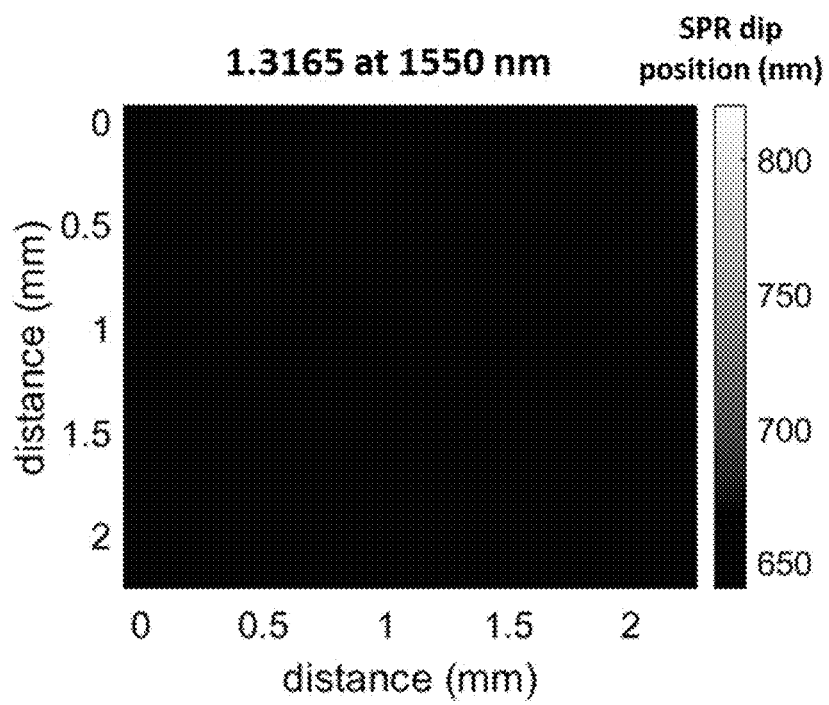
FIGS. 2A to 2C illustrate examples of surface plasmon resonance images obtained by the surface plasmon resonance imaging apparatus according to an embodiment of the present invention.
Figure 2B:
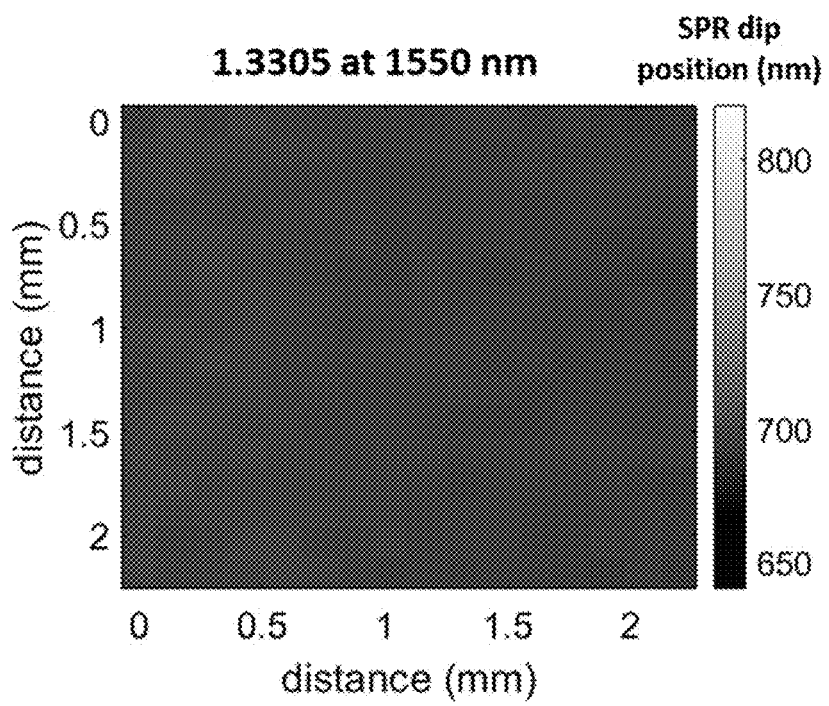
Figure 2C:
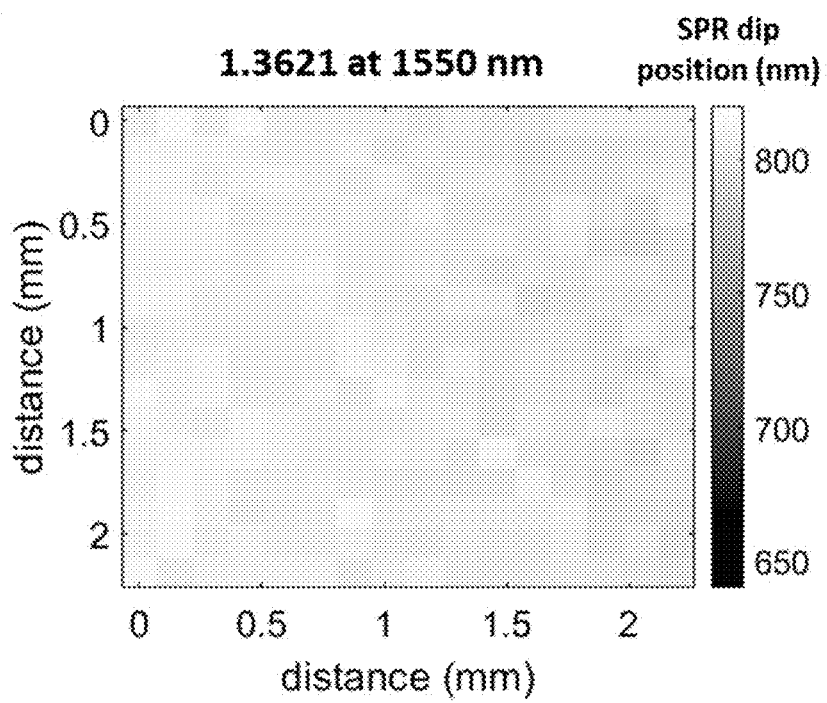

FIGS. 2A to 2C illustrate examples of surface plasmon resonance images obtained by the surface plasmon resonance imaging apparatus according to an embodiment of the present invention.

The surface plasmon resonance images illustrated in FIGS. 2A to 2C show a resonance center wavelength position based on a surface plasmon resonance with respect to a refractive index of a liquid sample where distilled water is mixed with glycerol.

Figure 3A:
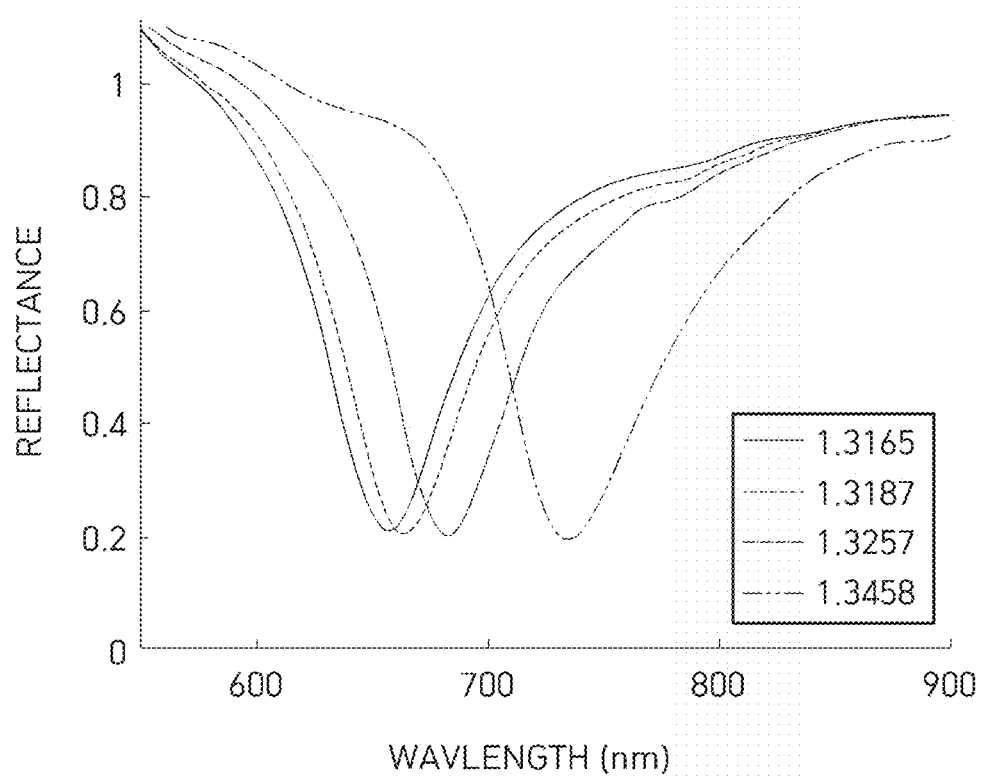
FIG. 3A illustrates a reflectance with respect to a wavelength in one pixel of a surface plasmon resonance image obtained by the surface plasmon resonance imaging apparatus according to an embodiment of the present invention.
Figure 3B:
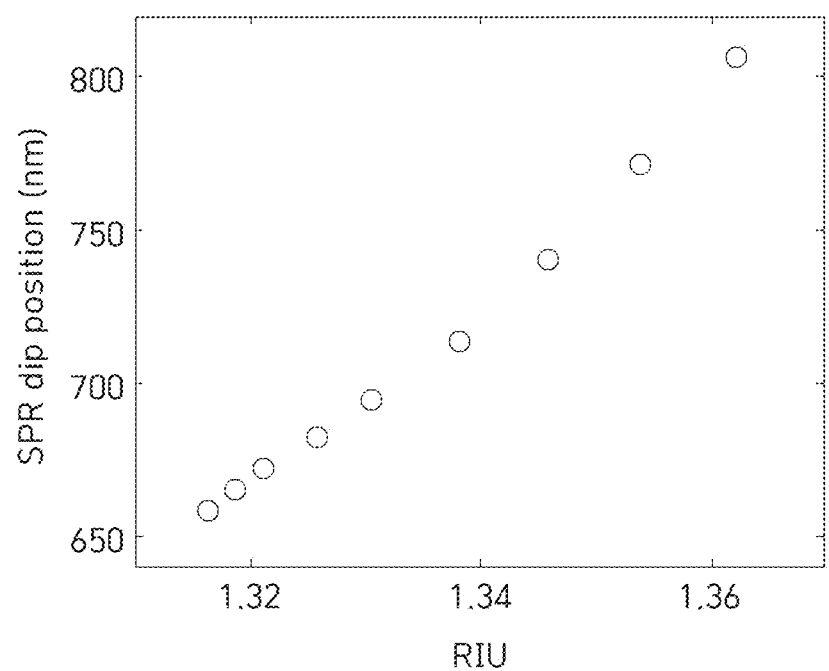
FIG. 3B illustrates a surface plasmon resonance wavelength position with respect to a refractive index of a sample in one pixel of a surface plasmon resonance image obtained by the surface plasmon resonance imaging apparatus according to an embodiment of the present invention.

FIG. 3A illustrates a reflectance with respect to a wavelength in one pixel of a surface plasmon resonance image obtained by the surface plasmon resonance imaging apparatus according to an embodiment of the present invention, and FIG. 3B illustrates a surface plasmon resonance wavelength position with respect to a refractive index of a sample in one pixel of a surface plasmon resonance image obtained by the surface plasmon resonance imaging apparatus according to an embodiment of the present invention.

Figure 4:
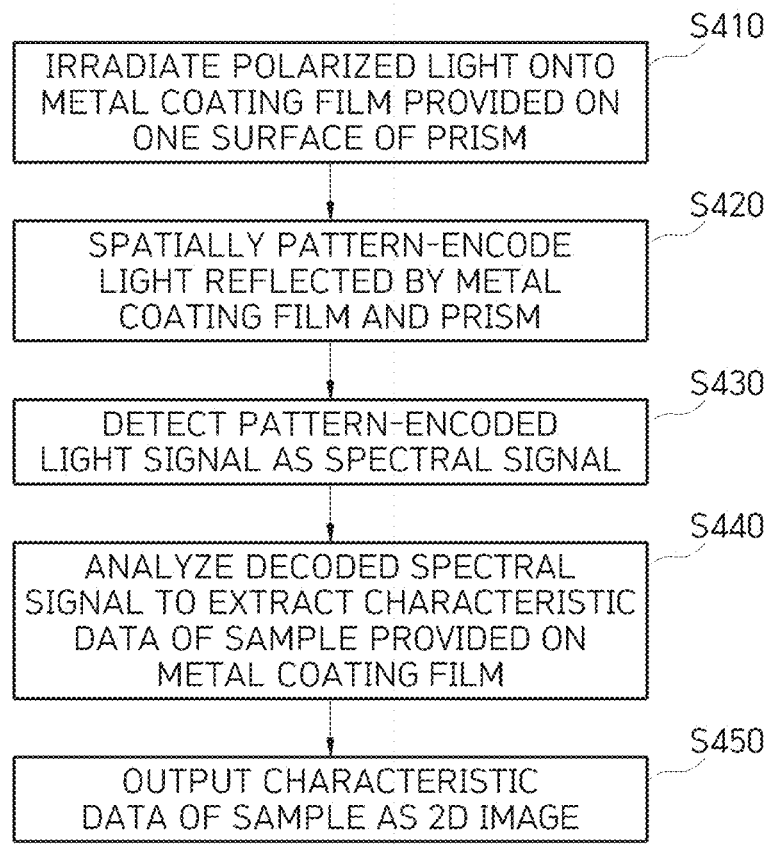
FIG. 4 is a flowchart for describing a surface plasmon resonance imaging method according to an embodiment of the present invention.

FIG. 4 is a flowchart for describing a surface plasmon resonance imaging method according to an embodiment of the present invention.

Referring to FIG. 4, in step S410, a process of irradiating polarized light onto a metal coating film provided on one surface of a prism by using a light irradiation unit may be performed.

Subsequently, in step S420, a process of spatially pattern-encoding light reflected by the metal coating film and the prism by using a light modulator may be performed.

Subsequently, in step S430, a process of detecting the pattern-encoded light signal as a spectral signal by using a light detector may be performed.

Subsequently, in step S440, a process of spatially decoding the detected spectral signal and analyzing the decoded spectral signal to extract characteristic data of a sample provided on the metal coating film by using a signal processor may be performed.

Subsequently, in step S450, a process of outputting (or displaying) the characteristic data of the sample as a 2D image by using an output unit may be performed.

In an embodiment, the pattern-encoding process S420 may include a process of pattern-encoding the reflected light as a 2D pattern.

In an embodiment, the pattern-encoding process S420 may include a process of pattern-encoding the reflected light by using the light modulator including one of a spatial light modulator (SLM), a digital micro-mirror device (DMD), an acousto-optic modulator (AOM), and a pattern disk.

In an embodiment, the process S430 of detecting the pattern-encoded light as the spectral signal may be a process of detecting the pattern-encoded light signal as the spectral signal by using the light detector including a spectroscope.

In an embodiment, the process S430 of detecting the pattern-encoded light as the spectral signal may include a process of concentrating the pattern-encoded light on an optical fiber by using a lens, a process of transferring the pattern-encoded light signal to the spectroscope of the light detector by using the optical fiber, and a process of detecting the pattern-encoded light as the spectral signal by using the spectroscope.

According to the surface plasmon resonance imaging apparatus and method of the present invention, a surface plasmon resonance image may be measured and a characteristic of a sample (for example, a concentration, a thickness, and a refractive index of a dielectric) may be analyzed based on a 2D image, and thus, the present invention may be used as a bio image sensor for measuring a characteristic of a bio-sample with an image without an indicator in various industrial fields (particularly, bio-industry).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A surface plasmon resonance imaging apparatus comprising:
    a light irradiator irradiating polarized light onto a metal coating film provided on one surface of a prism;
    a light modulator spatially pattern encoding light reflected by the metal coating film and the prism;
    a light detector configured to detect a pattern-encoded light signal, obtained through the pattern-encoding by the light modulator, as a spectral signal;
    a signal processor configured to spatially decode the spectral signal and analyze a decoded spectral signal to generate characteristic data of a sample provided on the metal coating film; and
    an output circuit configured to output the characteristic data of the sample as a two-dimensional (2D) image,
    wherein the light modulator pattern-encodes the reflected light as a 2D pattern, and
    wherein the 2D pattern comprises a random pattern, a structured pattern, a Fourier pattern, and a Hadamard pattern.

2. The surface plasmon resonance imaging apparatus of claim 1, wherein the light modulator comprises a spatial light modulator or a digital micro-mirror device, which spatially pattern-encodes the reflected light.

3. The surface plasmon resonance imaging apparatus of claim 1 wherein the light modulator comprises an acousto-optic modulator or a pattern disk, which spatially pattern-encodes the reflected light.

4. The surface plasmon resonance imaging apparatus of claim 1, wherein the light detector comprises a spectroscope configured to detect the pattern-encoded light signal as the spectral signal.

5. The surface plasmon resonance imaging apparatus of claim 1, wherein the light detector comprises:
    a lens configured to concentrate the pattern-encoded light signal on an optical fiber; and
    a spectroscope configured to detect the pattern-encoded light, transferred through the optical fiber, as the spectral signal.

6. A surface plasmon resonance imaging method comprising:
    irradiating polarized light onto a metal coating film provided on one surface of a prism by using a light irradiation unit;
    spatially pattern-encoding light reflected by the metal coating film and the prism by using a light modulator;
    detecting a pattern-encoded light signal as a spectral signal by using a light detector;
    spatially decoding the spectral signal and analyzing a decoded spectral signal to extract characteristic data of a sample provided on the metal coating film by using a signal processor; and
    outputting the characteristic data of the sample as a two-dimensional (2D) image by using an output unit,
    wherein the pattern-encoding comprises pattern-encoding the reflected light as a 2D pattern, and
    wherein the 2D pattern comprises a random pattern, a structured pattern, a Fourier pattern, and a Hadamard pattern.

7. The surface plasmon resonance imaging method of claim 6, wherein the light modulator comprises spatially pattern-encoding the reflected light by using the light modulator including one of a spatial light modulator, a digital micro-mirror device, an acousto-optic modulator, and a pattern disk.

8. The surface plasmon resonance imaging method of claim 6, wherein the light detector comprises a spectroscope.

9. The surface plasmon resonance imaging method of claim 6, wherein the detecting of the pattern-encoded light signal as the spectral signal comprises:
    concentrating the pattern-encoded light on an optical fiber by using a lens;
    transferring the pattern-encoded light signal to a spectroscope of the light detector by using the optical fiber; and
    detecting the pattern-encoded light as the spectral signal by using the spectroscope.

* * * * *